United States Patent
Rider et al.

(10) Patent No.: US 11,487,841 B2
(45) Date of Patent: Nov. 1, 2022

(54) TECHNIQUES FOR SELECTING A USER EXPERIENCE DESIGN

(71) Applicant: Capital One Services, LLC, McLean, VA (US)

(72) Inventors: Jonathan Rider, McLean, VA (US); Siraj Ali, McLean, VA (US); Anderson Osagie, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/101,660

(22) Filed: Nov. 23, 2020

(65) Prior Publication Data
US 2021/0073311 A1    Mar. 11, 2021

Related U.S. Application Data

(63) Continuation of application No. 16/538,776, filed on Aug. 12, 2019, now Pat. No. 10,853,442.

(51) Int. Cl.
| | |
|---|---|
| *G06F 40/103* | (2020.01) |
| *G06F 16/957* | (2019.01) |
| *G06F 16/951* | (2019.01) |
| *G06F 16/958* | (2019.01) |
| *G06N 20/00* | (2019.01) |

(52) U.S. Cl.
CPC ........ *G06F 16/9577* (2019.01); *G06F 16/951* (2019.01); *G06F 16/986* (2019.01); *G06N 20/00* (2019.01)

(58) Field of Classification Search
CPC . G06F 16/90; G06F 3/04; G06F 11/00; G06F 8/00; G06F 40/10; G06Q 10/00; G06N 20/00; G06N 5/00
See application file for complete search history.

(56) References Cited

U.S. PATENT DOCUMENTS

| | | | | |
|---|---|---|---|---|
| 2010/0131444 | A1* | 5/2010 | Gottlieb | G06Q 10/0631 706/46 |
| 2017/0193367 | A1* | 7/2017 | Miikkulainen | G06F 16/26 |

OTHER PUBLICATIONS

"How to: Use Cancellation to Break from a Parallel Loop", dated Nov. 4, 2016, retrieved from https://docs.microsoft.com/en-us/cpp/parallel/concrt/how-to-use-cancellation-to-break-from-a-parallel-loop?view=msvc-160 (Year: 2016).*

* cited by examiner

*Primary Examiner* — Sanchita Roy
(74) *Attorney, Agent, or Firm* — KDB (57) ABSTRACT

Various embodiments are generally directed to techniques for selecting a user experience design in a time-critical environment, such as based on the results of multiple classification processes while maintaining appropriate responsiveness, for instance. Some embodiments are particularly directed to selecting a website design experience based on results, or lack thereof, provided by a plurality of inference processes of varying accuracy within a predefined amount of time. For example, a page request, or indication thereof, may be received by an inference manager from a client device. In response to the page request, the inference manager may initiate one or more inference processes, and based on the response, or lack thereof, from each of the one or more inference process within a predetermine amount of time, the inference manager may provide an indication to an experience design selector. The experience design selector may then select, based on the indication, from a plurality user experience designs to provide to the client device in a page response.

15 Claims, 7 Drawing Sheets

Determine identification information corresponding to a client device based on a page request for a website received from the client device
402

↓

Initiate a timer, a first inference process, and a second inference process based on the identification information, wherein the first inference process utilizes a first machine learning algorithm in conjunction with a first datastore to classify the identification information and the second inference process utilizes a second machine learning algorithm in conjunction with a second datastore to classify the identification information
404

↓

Select a first user experience design from a set of two or more user experience designs to provide to the client device in response to the page request for the website when the first inference process returns a first positive result prior to expiration of the timer, wherein selection of the first user experience design is based on the first positive result
406

↓

Select a second user experience design from the set of two or more user experience designs to provide to the client device in response to the page request for the website when the second inference process returns a second positive result prior to expiration of the timer and the first inference process fails to return any result or returns a first error result prior to expiration of the timer, wherein selection of the second user experience design is based on the second positive result
408

↓

Provide the first user experience design to the client device when the first user experience design is selected
410

↓

Provide the second user experience design to the client device when the second user experience design is selected
412

Determining information corresponding to a request for website data from a client device, the information associated with the client device
502

Starting a timer, a first inference process, and a second inference process based on the information, wherein the first inference process utilizes a first machine learning algorithm in conjunction with a first datastore to classify the information and the second inference process utilizes a second machine learning algorithm in conjunction with a second datastore to classify the information
504

Selecting a first website dataset from two or more website datasets to provide data to the client device from in response to the request for the website data when the first inference process returns a first positive result prior to expiration of the timer, wherein selection of the first website dataset is based on the first positive result
506

Selecting a second website dataset from the two or more sets of website data to provide data to the client device from in response to the request for the website data when the second inference process returns a second positive result prior to expiration of the timer and the first inference process fails to return any result or returns a first error result prior to expiration of the timer, wherein selection of the second website dataset is based on the second positive result
508

TECHNIQUES FOR SELECTING A USER EXPERIENCE DESIGN

CROSS-REFERENCE TO RELATED APPLICATIONS

This application is a continuation of U.S. patent application Ser. No. 16/538,776, entitled "TECHNIQUES FOR SELECTING A USER EXPERIENCE DESIGN" filed on Aug. 12, 2019. The contents of the aforementioned application are incorporated herein by reference in their entirety.

BACKGROUND

Generally, user experience may refer to a person's perceptions and responses that result from the use or anticipated use of a product, system, and/or service. This may include one or more of a user's emotions, beliefs, preferences, perceptions, physical responses, psychological responses, and behaviors that occur before, during, and after use. User experience design may refer to the process of enhancing user experience/satisfaction with a product, system, and/or service by improving the usability, accessibility, and desirability provided in the interaction with the product, system, and/or service. Typically, user experience design includes the practice of designing products, processes, services, event, omnichannel journeys, and/or environments with a focus placed on the quality of the user experience and culturally relevant solutions. For example, an enterprise may engage in user experience design to improve customer satisfaction.

BRIEF DESCRIPTION OF THE DRAWINGS

FIG. 4 illustrates a second exemplary logic flow according to one or more embodiments described herein.

DETAILED DESCRIPTION

Various embodiments are generally directed to techniques for selecting a user experience design, such as based on the results of multiple classification processes while maintaining appropriate responsiveness, for instance. Some embodiments are particularly directed to selecting a website design experience based on results, or lack thereof, provided by a plurality of inference processes of varying accuracy within a predefined amount of time. In one embodiment, for example, an apparatus may comprise a processor and memory comprising instructions that when executed by the processor cause the processor to perform one or more of the following. In many embodiments, the processor may detect a page request for a website. In many such embodiments, the page request may be received from a client device. In several embodiments, the processor may determine identification information corresponding to the client device based on the page request for the website. In various embodiments, the processor may initiate a timer, a first inference process, and a second inference process based on the identification information. In various such embodiments, the first inference process may utilize a first datastore and the second inference process may utilize a second datastore.

In some embodiments, the processor may select a first user experience design from a set of three or more user experience designs to provide to the client device in response to the page request for the website when the first inference process returns a first positive result prior to expiration of the timer. In some such embodiments, selection of the first user experience design may be based on the first positive result. In many embodiments, the processor may select a second user experience design from the set of three or more user experience designs to provide to the client device in response to the page request for the website when the second inference process return a second positive result prior to expiration of the timer and the first inference process fails to return any result or returns a first error result prior to expiration of the timer. In many such embodiments, selection of the second user experience design may be based on the second positive result. In several embodiments, the processor may select a third user experience design from the set of three or more user experience designs to provide to the client device in response to the page request for the website when the first inference process fails to return any result or returns an error result prior to expiration of the timer and the second inference process fails to return any result or returns a second error result prior to expiration of the timer.

Some challenges facing user experience design selection include making an informed decision in a time-critical environment based on limited information. For example, a default or generic user experience design may be provided to all clients such that access to the associated product, system, and/or service may be provided in an acceptable amount of time. However, providing a default or generic user experience, results in a midline user experience that fails to satisfy diverse types of clients. Adding further complexity, information regarding a client must be known in order to effectively select a user experience design for the client. However, varying amounts of information may be available to classify the type of a client, making it difficult to reliably classify client type. Further compounding this issue, the amount of information available to classify the type of client may be unknown until the product, system, and/or service is actually requested by the client. These and other factors may result in poor user experiences, resulting in missed opportunities foster client relationships and increased competition. Such limitations can drastically reduce the appeal of products, systems, and/or services offered by an enterprise, contributing to lost revenues, limited adaptability, and inept client interaction.

Various embodiments described herein include an inference manager to initiate two or more inference processes to effectively classify a client in response to a request for a product, system, and/or service from the client. In various such embodiments, the classification, or type, of the client may be utilized to effectively select a user experience design tailored to the particular client type. In many embodiments, the two or more inference processes may classify the client based on varying amounts and/or sources of information, resulting in a tradeoff between accuracy and reliable speed. In many such embodiments, the most accurate inference process that returns a result within a predetermined amount of time may be utilized to accurately select a user experience design. One or more of these components and/or techniques may be used as part of a novel process to automatically make an informed decision in a time-critical environment based on varying amounts of information, resulting in improved user experiences.

One or more techniques described herein may enable increased adaptability and appeal of products, systems, and/or services, promoting improved client relationships and leading to increased customer satisfaction and relatability. In these and other ways, components/techniques described here may identify methods to increase efficiency, decrease performance costs, improve public perception, increase revenue, decrease computational cost, and/or reduce resource requirements via provision of tailored customer experience designs in an accurate, reactive, efficient, dynamic, and scalable manner, resulting in several technical effects and advantages over conventional computer technology, including increased capabilities and improved adaptability. In various embodiments, one or more of the aspects, techniques, and/or components described herein may be implemented in a practical application via one or more computing devices, and thereby provide additional and useful functionality to the one or more computing devices, resulting in more capable, better functioning, and improved computing devices. Further, one or more of the aspects, techniques, and/or components described herein may be utilized to improve one or more technical fields including user experience design, client classification, client interaction, and provision of products, systems, and/or services.

In several embodiments, components described herein may provide specific and particular manners of to enable automatic selection of a user experience design in a time-critical environment. In several such embodiments, the specific and particular manners may include, for instance, one or more of initiating a plurality of inference processes that utilize varying inputs and/or models to classify a client in response to a request for a product, system, and/or service and selecting a user experience design based on results, or lack thereof, provided by the plurality of inference processes within a predefined amount of time. In many embodiments, one or more of the components described herein may be implemented as a set of rules that improve computer-related technology by allowing a function not previously performable by a computer that enables an improved technological result to be achieved. For example, the function allowed may include one or more aspects of user experience design, client classification, client interaction, and provision of products, systems, and/or services described herein.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatuses may be specially constructed for the required purpose or may include a general-purpose computer. The required structure for a variety of these machines will be apparent from the description given.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well known structures and devices are shown in block diagram form to facilitate a description thereof. The intention is to cover all modification, equivalents, and alternatives within the scope of the claims.

Figure 1:
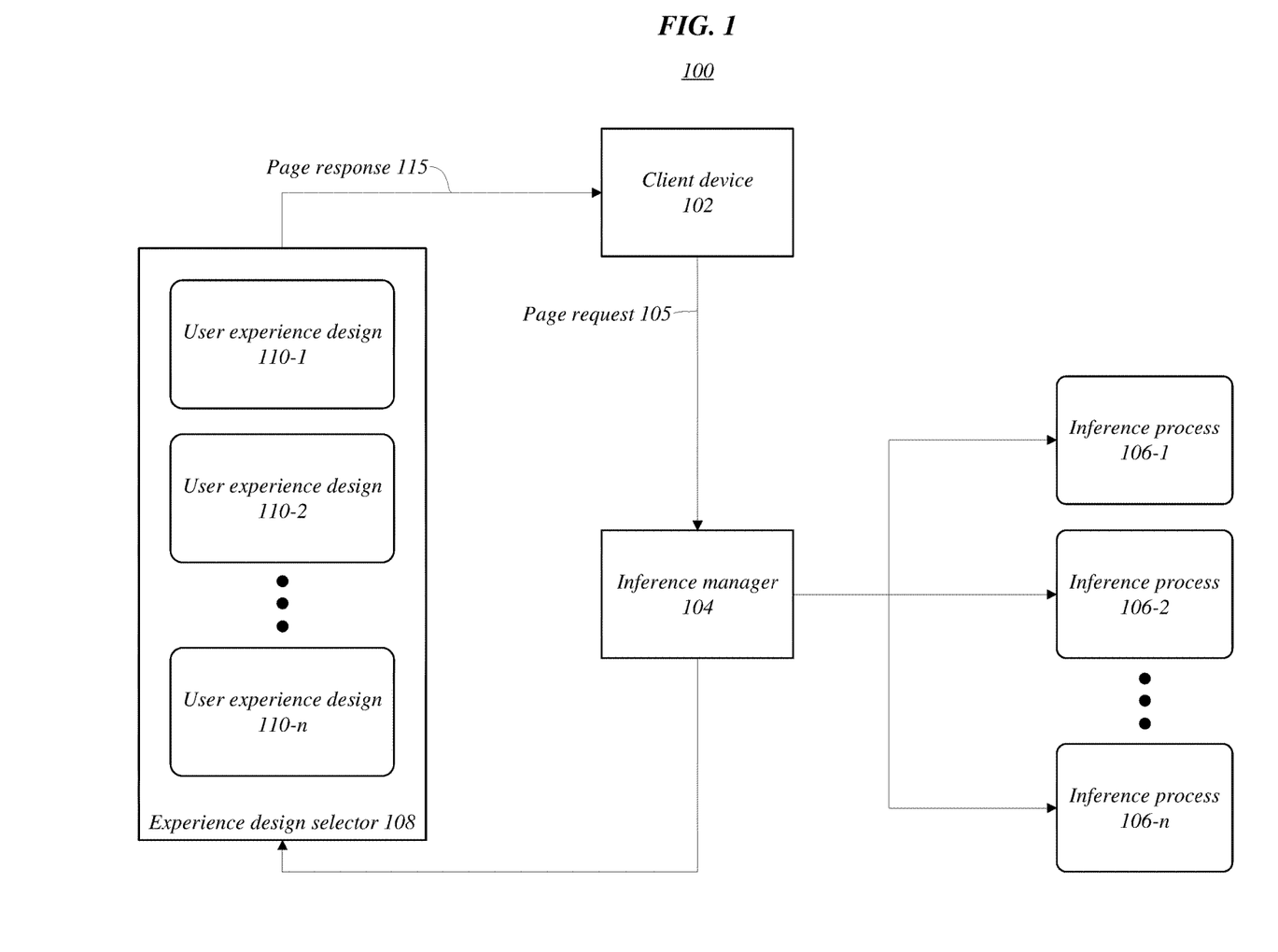
FIG. 1 illustrates a first exemplary operating environment according to one or more embodiments described herein.

FIG. 1 illustrates an exemplary operating environment 100 according to one or more embodiments described herein. Operating environment 100 may include a client device 102, an inference manager 104, one or more inference processes 106-1, 106-2, 106-n (or inference processes 106), and experience design selector 108 with one or more user experience designs 110-1, 110-2, 110-n (or user experience designs 110). In one or more embodiments described herein, a page request 105, or indication thereof, may be received by the inference manager 104 from client device 102. In one or more such embodiments, in response to the page request 105, inference manager 104 may initiate one or more inference processes 106. In several embodiments, based on the response, or lack thereof, from each of the one or more inference process 106 within a predetermine amount of time, inference manager 104 may provide an indication to experience design selector 108. In several such embodiments, experience design selector 108 may select, based on the indication, one of the one or more user experience designs 110 to provide to the client device 102 in a page response 115. Embodiments are not limited in this context.

In various embodiments, inference manager 104 may be utilized, such as by an enterprise, to initiate, monitor, and/or manage the inference processes 106. In various such embodiments, inference manager 104 may initiate, monitor, and/or manage the inference processes 106 in response to page request 105. In many embodiments, the inference processes 106 may be utilized to make a determination regarding the client device 102 and/or user thereof based on page request 105 and/or additional information. For instance, each of the inference processes 106 may seek to classify the client device 102 and/or user thereof in a manner that provides insights into preferences of the user. In such instances, these insights may be used by experience design selector 108 to choose one of the user experience designs 110 to provide to the client device 102 in page response 115.

Embodiments may utilize any type of available information to classify client device 102 and/or user thereof in a manner that provides insights into preferences of the user. For instance, the information included in page request 105, or gained based thereon, may include one or more of an internet protocol (IP) address, a user name, cookies, profile data, a geographic region, a time stamp, public records, enterprise records, social media data, search history, age, gender, interests, occupation, income, culture, and the like. In several embodiments, the information may be included in page request 105 or obtained based thereof. In some embodiments, different inference processes may use different sets and/or subsets of the available information to generate results for use in selection of an appropriate user experience design.

In various embodiments, the insights, classifications, and/or lack thereof may be provided to inference manager 104 as results from each of the inference processes 106. In some embodiments described herein, reference to a client device or a user may refer to a client device and/or user thereof. In many embodiments, inference manager 104 may select preferred results from one of the inference processes 106 based on a set of rules and/or preferences, as will be described in more detail below. In several embodiments, inference manager 104 may provide an indication, such as a class, to experience design selector 108 based on the preferred results of inference processes 106. In several such embodiments, experience design selector 108 may provide one of user experience designs 110 to client device 102 in page response 115 based on the indication. In other embodiments, inference manager 104 may provide the preferred results from one of the inference processes 106 to experience design selector 108 and experience design selector 108 may determine which user experience design 110 to provide to client device 102 in page response 115 based on the preferred results. In various embodiments, inference manager 104, may stop or alter inference processes based on a status of a respective inference process or other inference processes. For instance, inference process 106-1 may be terminated based on results being received from inference process 106-2.

More generally, an inference process may include, or refer to, one or more components and/or techniques used to make a classification. For instance, an inference process may include, or refer to, a technique comprising one or more inference models (e.g., a statistical and/or machine learning model) and a component comprising one or more datastores. In several embodiments, each of the inference processes 106 may be selected or created to have different characteristics. In several such embodiments, the different characteristics of the various inference processes 106 may cause them to produce a preferred classification in different scenarios, such as based on the amount of available information regarding the client device 102 and/or user thereof.

In one or more embodiments described herein, an arbitrary number of inference processes may be used. In one or more such embodiments, the characteristics of each inference process may be tuned for a set of target scenarios. In various embodiments, an arbitrary number of characteristics may be utilized to describe each inference process. In various such embodiments, characteristics of an inference process may be determined empirically and/or theoretically. In several embodiments, the characteristics may be based on subjective and/or objective criteria. In some embodiments, the characteristics may include one or more operating parameters, settings and/or performance metrics of an inference process.

In many embodiments, each inference process may be characterized based on speed, accuracy, and error rate. Accordingly, in some embodiments, inference process 106-1 may be characterized as high speed, low accuracy, and low error rate, inference process 106-2 may be characterized as medium speed, medium accuracy, and medium error rate, and inference process 106-$n$ may be characterized as low speed high accuracy, and high error rate. In some such embodiments, inference process 106-$n$ may be preferred in scenarios that it returns a result without error, inference process 106-2 may be preferred in scenarios that it returns a result without error and inference process 106-$n$ returns a result with error, and inference process 106-1 may be preferred in scenarios that it returns a result without error and inference processes 106-2, 106-$n$ return results with errors.

In various embodiments, the speed of an inference process may refer to the amount of time it takes to produce a result. The speed of an inference process may be affected by and/or characterized based on numerous factors, such as input data requirements, input data accessibility, input data availability, inference model type, and/or implementing hardware. For instance, faster inference processes may require little to no information regarding the client device 102 and/or user thereof while slower inference processes may require relatively large amounts of information regarding the client device 102 and/or user thereof. In some embodiments, faster inference processes may only utilize information regarding the client device 102 and/or user thereof included in the page request 105 and/or information located in local memory. For example, one or more such inference processes may only use an internet protocol (IP) address included in the page request 105 to classify the client device 102. In another example, one or more such inference processes may utilize profile data previously acquired by an enterprise (e.g., as part of a registration process) that is readily accessible by the enterprise (e.g., stored in an enterprise controlled datastore).

On the other hand, slower inference processes may utilize information regarding the client device 102 and/or user thereof that is located in a remote memory and/or must be collected. In many embodiments, slower inference processes may query a third-party datastore for information regarding client device 102 based on information in page request 105. In some embodiments, the third-party datastore may include different amounts of information regarding different client devices. In many embodiments, an inference process, or hardware implementing the inference process, may have different capabilities and/or requirements that affect the speed of the inference process. For instance, some inference models may require more computer resources, leading to a slower inference process. In another instance, some inference models may be implemented on fewer or less capable computer hardware (e.g., processing speed, memory size, communication bandwidth), leading to a slower inference process.

In various embodiments, the amount of information available on client device 102 may affect aspects of one or more of the inference processes 106, such as results or the inference model used. For example, a third-party datastore may not include any information be available at all, leading to results that indicate an error, which will be addressed in more detail below. In many embodiments, which inference process results are provided to experience design selector 108 for selection of one of the user experience designs 110 may be based, directly or indirectly, on the amount of available information on a user and the accessibility of that information. For instance, the results of more accurate inference processes may be preferred, but if input information required by the more accurate inference processes is not available, then the results of a less accurate inference process may be used to select the user experience design.

In many embodiments, the accuracy of an inference process may refer a probability of inference results (e.g., resulting insights or classifications) being correct and/or a level of detail in or granularity of the results. For example, a more accurate inference process may classify client device 102 into one or more of ten different classes, while a less accurate inference process may classify client device 102 into one or more of three different classes. In another example, a more accurate inference process may correctly classify client device 102 a higher percentage of the time than a less accurate inference process. In some embodiments, inference processes may be characterized on the probability of inference results being correct independently of the level of detail in or granularity of results. As will be appreciated any number, type, or combination of metrics may be used to characterize inference processes and/or tune inference processes for a set of target scenarios.

In several embodiments, the error rate of an inference process may refer to a probability of an inference process not identifying any correlations between data provided as input and a client device and/or user thereof. For example, if client device 102 is not associated with any user in a client database, an inference process that utilizes the client database may return an error. On the other hand, if client device 102 is associated with a user in the client database, the inference process that utilizes the client database may return results based on a profile for the user in the client database. In another example, if a third-party user-insights database is able to associate client device 102 with an entity, then an inference process may utilize the corresponding third-party user-insights to generate results. However, if the commercial user-insights data base is not able to associate client device 102 with an entity, the inference process may return an error. Accordingly, if an inference process returns an error four out of ten times, then the inference process may be characterized with a 40% error rate.

In some embodiments, inference manager 104 and/or inference processes 106 may only be utilized once or periodically to assign a user experience design. For example, a user experience design may be assigned when client device 102 visits a landing page of a website or a user experience design may be reevaluated/reassigned each month. In some embodiments, a user experience design may be reassigned when results from a high accuracy inference process are available. For instance, inference manager 104 may only start inference processes with a higher accuracy than the inference process a current user experience design assignment was based on. In various embodiments, a user experience design may be reevaluate/reassigned only when new or additional information regarding client device 102 is available. In various such embodiments, inference manager 104 may determine the availability of new or addition information regarding client device 102.

Figure 2:
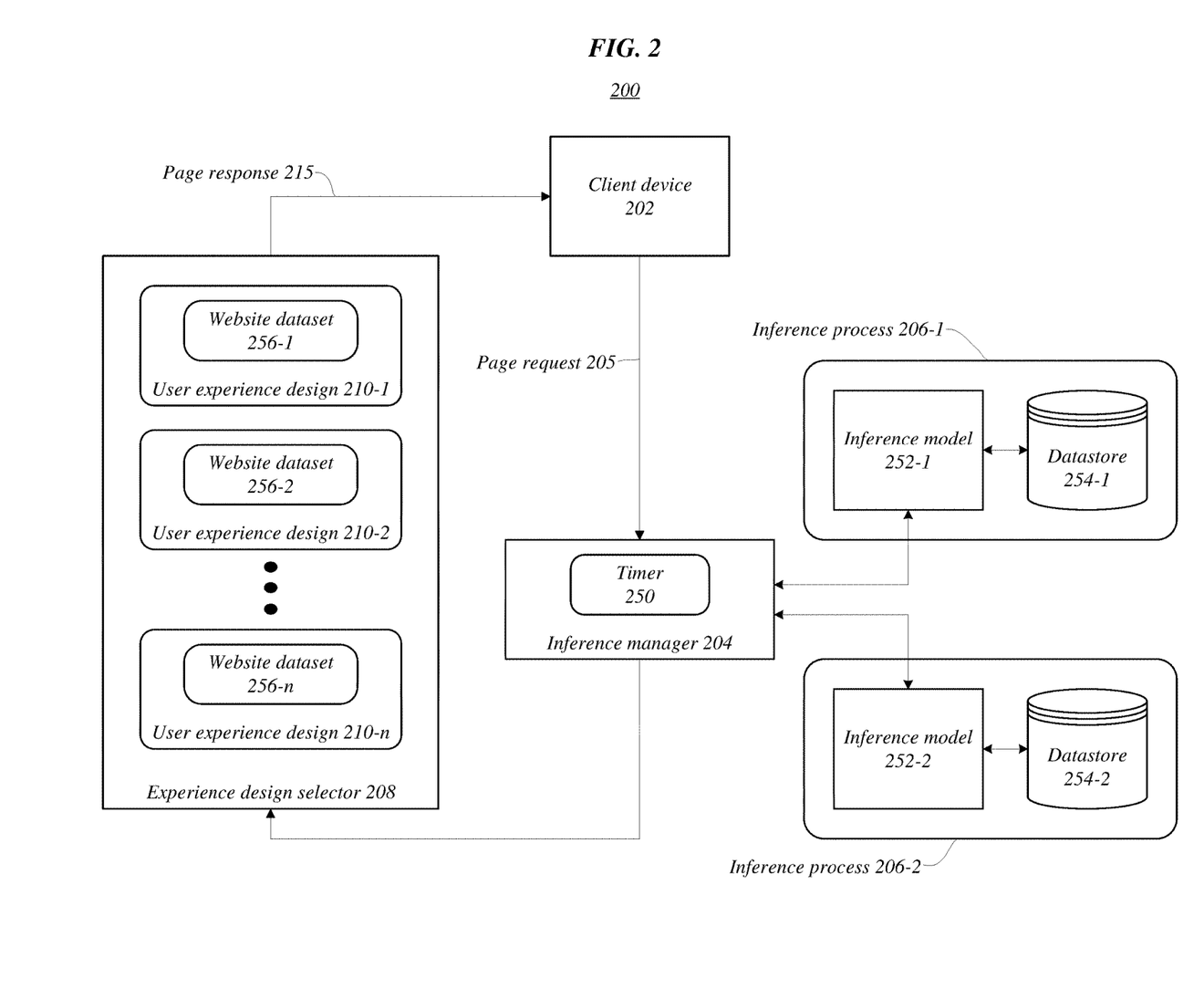
FIG. 2 illustrates a second exemplary operating environment according to one or more embodiments described herein.

FIG. 2 illustrates an exemplary operating environment 200 according to one or more embodiments described herein. In some embodiments, operating environment 200 and/or components thereof may be the same or similar to operating environment 100 and/or components thereof. Operating environment 200 may include a client device 202, an inference manager 204 with timer 150, inference process 206-1 with inference model 252-1 and datastore 254-1, inference process 206-2 with inference model 252-2 and datastore 254-2, and experience design selector 208 with one or more user experience designs 210-1, 210-2, 210-n (or user experience designs 210) that include website datasets 256-1, 256-2, 256-n (or website datasets 256). In one or more embodiments described herein, inference manager 204 may race multiple inference models (e.g., inference models 106-1, 106-2) against each other and/or expiration of timer 250 to select an appropriate user experience design. Embodiments are not limited in this context.

In several embodiments, inference manager 204 may initiate inference process 206-1, initiate inference process 206-2, and start timer 250 in response to page request 205. In such embodiments, a user experience design of a website (e.g., one of website datasets 256-1, 256-2, 256-n) may be provided to client device 202 by experience design selector 208 in page response 215 based on results, or lack thereof, provided by inference processes 206 and/or expiration of timer 250. For example, when a user visits a website of an enterprise via client device 202, the enterprise may want to customize the website experience based on the type of customer (e.g., upmarket or mainstream) based on limited information on the customer (e.g., cookies). In some examples, a third-party provider may offer services to match the limited information to an entity and provide data (e.g., from datastore 254-1) that can be used in a high accuracy machine learning model (e.g., inference model 252-1). However, this information can take a relatively long time to retrieve and/or the third-party provider may be unable to identify a match (e.g., return an error), potentially leading to a poor user experience. Therefore, in some embodiments, a lower accuracy machine learning model (e.g., inference model 252-2) that only uses information directly obtained from client device 202 may be used by experience design selector 208 in the absence of error free results from inference process 206-1. In some such embodiments.

In an exemplary embodiment, inference process 206-1 may include a high accuracy, low speed, and high error rate inference process while inference process 206-2 may include a low accuracy, high speed, and low error rate inference process. In some embodiments, inference manager 204 may initiate both inference processes 206 and start timer 250 in response to page request 205. In some embodiments, inference manager 204 may maintain control over each of the inference processes 206 and have the ability to kill either one at any time.

In many embodiments, results, or indications thereof, may be provided to experience design selector 208 for selection of one of user experience designs 210 based on one or more of the following rules. When inference process 206-1 (i.e., the high accuracy process) returns first and doesn't error out, then inference process 206-2 (i.e., the low accuracy process) may be killed and the high accuracy results may be used. When the high accuracy process returns first but errors out, the low accuracy results may be used. When the low accuracy process returns first, if timer 250 expires before high accuracy results are received, then the low accuracy results may be used, if the high accuracy results are received with error before timer 250 expires, then the low accuracy results may be used, and if the high accuracy results are received without error before timer 250 expires, then the high accuracy results may be used. When timer 250 expires before either of inference processes 206 return a result, a default user experience design may be used.

In several embodiments, experience design selector 208 may select from one or more user experience designs 210 based on the results of inference process 206-1 and/or inference process 206-2. In several such embodiments, the selected user experience design may be provided as one or more portions of a corresponding website dataset in page response 215. In many embodiments, one or more portions of a selected website dataset may be provided to client device 202 in one or more page responses and/or based on one or more page requests. In some embodiments, one or more of website datasets 256 may include any data relevant to an associated class of user, such as themes, price data, recommended products, suggestions, graphics, special offers, content, preferences, and the like.

As previously mentioned, timer 250 may expire after a specific duration. In various embodiments, the specific duration for expiration of timer 250 may be determined based one or more factors associated with components and/or the operation thereof. For example, the duration of timer 250 may be determined based on one or more aspects of the client device 202 (e.g., maintaining a quality of service), the page request 205 (e.g., priority level), inference manager 204 (e.g., historical results and timer data), inference process 206-1 and/or components thereof (e.g., inference model 252-1 and datastore 254-1), inference process 206-2 and/or components thereof (e.g., inference model 252-2 and datastore 254-2). In some embodiments, the duration of timer 250 may be increased/decreased by inference manager 204 based on characteristics of one or more of inference processes 206. For instance, a longer timer may be used when inference model 252-1 utilizes a computationally intensive machine learning algorithm. In various embodiments, longer timers may be used when input data for an inference process must be requested, collected, and/or located, such as from a third-party datastore.

In the illustrated embodiment, inference process 206-1 includes inference model 252-1 and datastore 254-1 and inference process 206-1 includes inference model 252-2 and datastore 254-1. In various embodiments, inference models may include or refer to statistical and/or machine learning techniques utilized to draw conclusions (e.g., make a classification) based on input data. In various such embodiments, the input data for the inference model may be requested, collected, and/or received from an associated datastore. For instance, inference model 252-1 may utilize input data from datastore 254-1 and inference model 252-2 may utilize input data from datastore 254-2.

In several embodiments, a datastore may refer to one or more computer-readable mediums. In various embodiments, different aspects/components of an inference process may be owned, or controlled, by different entities. For example, in some embodiments, datastore 254-1 may be owned, or at least controlled by, an enterprise while datastore 254-2 is owner, or at least controlled by, a third-party. In some embodiments, different inference processes may share and/or utilize multiple inference models and/or datastores. In various embodiments, inference models and datastores may be physically separate as long as information can still be communicated therebetween, such as via a network.

Figure 3:
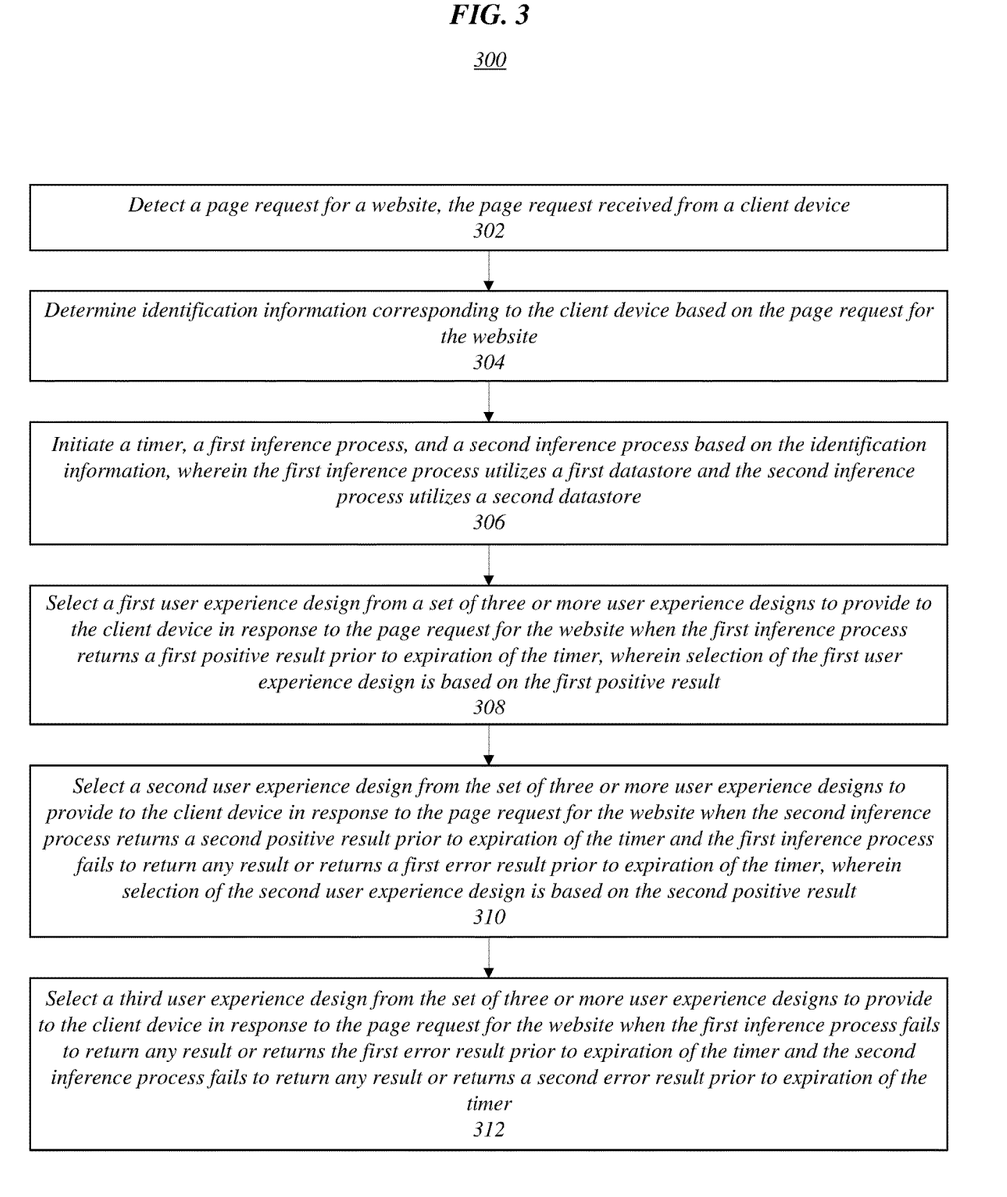
FIG. 3 illustrates a first exemplary logic flow according to one or more embodiments described herein.

FIG. 3 illustrates one embodiment of a logic flow 300, which may be representative of operations that may be executed in various embodiments in conjunction with techniques for inferring user preferences and/or selecting user experience designs. The logic flow 300 may be representative of some or all of the operations that may be executed by one or more components/devices/environments described herein, such as translator inference manager 104, one or more of inference processes 106, and/or experience design selector 108. The embodiments are not limited in this context.

In the illustrated embodiments, logic flow 300 may begin at block 302. At block 302 "detect a page request for a website, the page request received from a client device" a page request for a website received from a client device may be detected. In some embodiments, inference manager 204 may detect page request 205 received from client device 202. At block 304 "determine identification information corresponding to the client device based on the page request for the website" identification information corresponding to the client device may be determined based on the page request for the website. For example, inference manager 204 may determine identification information corresponding to client device 202 based on page request 205.

Continuing to block 306 "initiate a timer, a first inference process, and a second inference process based on the identification information, wherein the first inference process utilizes a first datastore and the second inference process utilizes a second datastore" a timer, a first inference process that utilizes a first datastore, and a second inference process that utilizes a second datastore may be initiated based on the identification information. In various embodiments, inference manager 204 may initiate timer 250, inference process 206-1, and inference process 206-2 based on identification information in page request 205. In various such embodiments, inference process 206-1 may utilize inference model 252-1 and datastore 254-1 while inference process 206-2 may utilize inference model 252-2 and datastore 254-2.

Proceeding to block 308 "select a first user experience design from a set of three or more user experience designs to provide to the client device in response to the page request for the website when the first inference process returns a first positive result prior to expiration of the timer, wherein selection of the first user experience design is based on the first positive result" a first user experience design may be selected from a set of user experience designs to provide to the client device in response to the page request when the first inference process returns a first positive result prior to expiration of the timer. For example, experience design selector 208 may choose user experience design 210-1 when inference process 206-1 returns a positive result (e.g., results with no error) before timer 250 expires.

At block 310 "select a second user experience design from the set of three or more user experience designs to provide to the client device in response to the page request for the website when the second inference process returns a second positive result prior to expiration of the timer and the first inference process fails to return any result or returns a first error result prior to expiration of the timer, wherein selection of the second user experience design is based on the second positive result" a second user experience design may be selected from the set of user experience designs to provide to the client device in response to the page request when the second inference process returns a second positive result prior to expiration of the timer and the first inference process fails to return any result or returns a first error result prior to expiration of the timer. For example, experience design selector 208 may choose user experience design 210-2 when inference process 206-2 returns a positive result (e.g., results with no error) and inference process 206-1 fails to return a result before timer 250 expires or returns an error result.

Continuing to block 312 "select a third user experience design from the set of three or more user experience designs to provide to the client device in response to the page request for the website when the first inference process fails to return any result or returns the first error result prior to expiration of the timer and the second inference process fails to return any result or returns a second error result prior to expiration of the timer" a third user experience design may be selected from the set of user experience designs to provide to the client device in response to the page request when the first inference process fails to return any result or returns the first error result prior to expiration of the timer and the second inference process fails to return any result or returns a second error result prior to expiration of the timer. For example, experience design selector 208 may choose user experience design 210-*n* when inference process 206-1 fails to return any result or returns the first error result prior to expiration of the timer and the inference process 206-2 fails to return any result or returns a second error result prior to expiration of the timer.

FIG. 4 illustrates one embodiment of a logic flow 400, which may be representative of operations that may be executed in various embodiments in conjunction with techniques for inferring user preferences and/or selecting user experience designs. The logic flow 400 may be representative of some or all of the operations that may be executed by one or more components/devices/environments described herein, such as translator inference manager 104, one or more of inference processes 106, and/or experience design selector 108. The embodiments are not limited in this context.

In the illustrated embodiments, logic flow 400 may begin at block 402. At block 42 "determine identification information corresponding to a client device based on a page request for a website received from the client device" identification information corresponding to the client device may be determined based on the page request for the website. For example, inference manager 204 may determine identification information corresponding to client device 202 based on page request 205. Proceeding to block 404 "initiate a timer, a first inference process, and a second inference process based on the identification information, wherein the first inference process utilizes a first machine learning algorithm in conjunction with a first datastore to classify the identification information and the second inference process utilizes a second machine learning algorithm in conjunction with a second datastore to classify the identification information" a timer, a first inference process that utilizes a first machine learning algorithm in conjunction with a first datastore to classify the identification information, and a second inference process that utilizes a second machine learning algorithm in conjunction with a second datastore to classify the identification information may be initiated. In various embodiments, inference manager 204 may initiate timer 250, inference process 206-1, and inference process 206-2 based on identification information in page request 205. In various such embodiments, inference process 206-1 may utilize inference model 252-1 and datastore 254-1 while inference process 206-2 may utilize inference model 252-2 and datastore 254-2.

Proceeding to block 406 "select a first user experience design from a set of two or more user experience designs to provide to the client device in response to the page request for the website when the first inference process returns a first positive result prior to expiration of the timer, wherein selection of the first user experience design is based on the first positive result" a first user experience design may be selected from a set of user experience designs to provide to the client device in response to the page request when the first inference process returns a first positive result prior to expiration of the timer. For example, experience design selector 208 may choose user experience design 210-1 when inference process 206-1 returns a positive result (e.g., results with no error) before timer 250 expires.

At block 408 "select a second user experience design from the set of two or more user experience designs to provide to the client device in response to the page request for the website when the second inference process returns a second positive result prior to expiration of the timer and the first inference process fails to return any result or returns a first error result prior to expiration of the timer, wherein selection of the second user experience design is based on the second positive result" a second user experience design may be selected from the set of user experience designs to provide to the client device in response to the page request when the second inference process returns a second positive result prior to expiration of the timer and the first inference process fails to return any result or returns a first error result prior to expiration of the timer. For example, experience design selector 208 may choose user experience design 210-2 when inference process 206-2 returns a positive result (e.g., results with no error) and inference process 206-1 fails to return a result before timer 250 expires or returns an error result.

Continuing to block 410 "provide the first user experience design to the client device when the first user experience design is selected" the first user experience design may be provided to the client device when the first user experience design is selected. For instance, user experience design 210-1 may be provided to client device 202, such as in page response 215 when user experience design 210-1 is selected. At block 412 "provide the second user experience design to the client device when the second user experience design is selected" the second user experience design may be provided to the client device when the second user experience design is selected. For example, user experience design 210-2 may be provided to client device 202, such as in page response 215 when user experience design 210-2 is selected.

Figure 5:
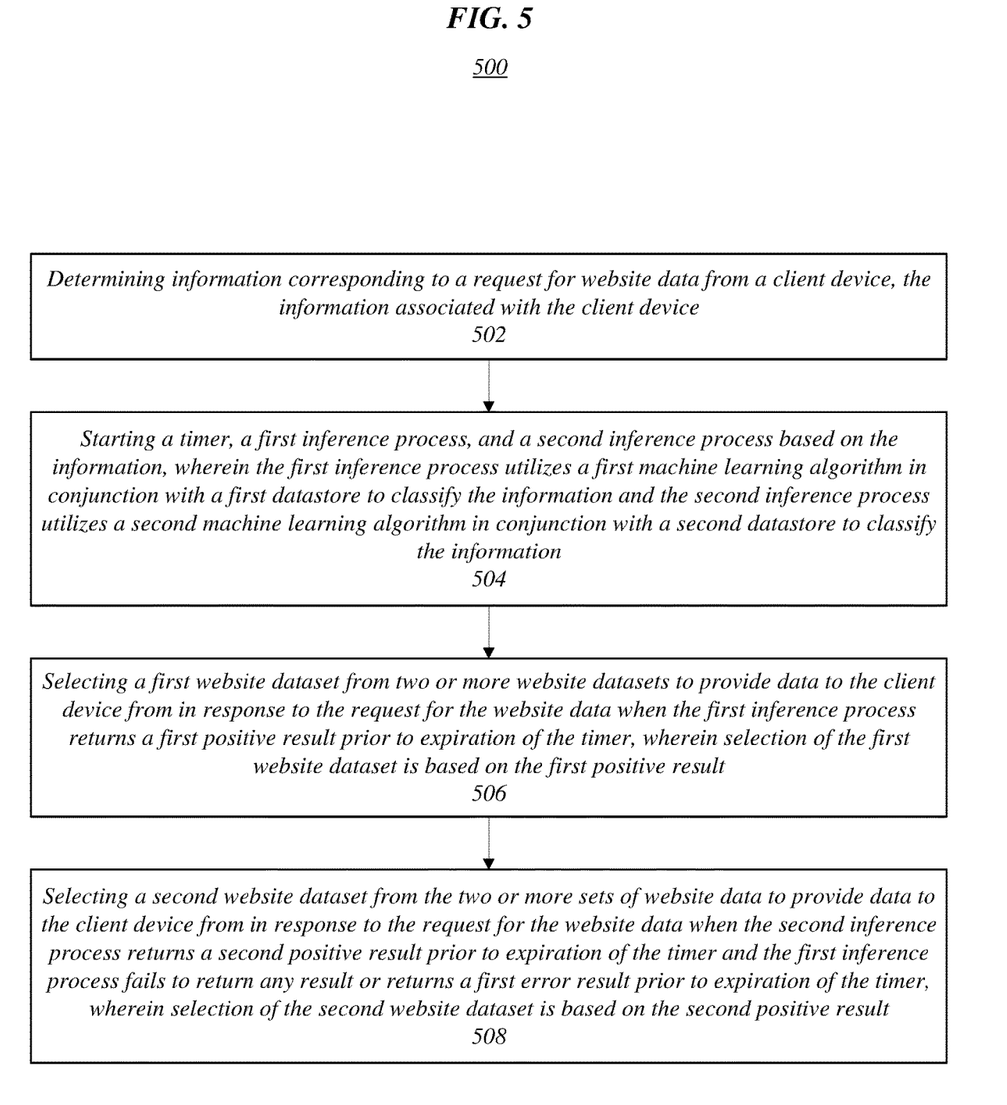
FIG. 5 illustrates a third exemplary logic flow according to one or more embodiments described herein.

FIG. 5 illustrates one embodiment of a logic flow 500, which may be representative of operations that may be executed in various embodiments in conjunction with techniques for inferring user preferences and/or selecting user experience designs. The logic flow 500 may be representative of some or all of the operations that may be executed by one or more components/devices/environments described herein, such as translator inference manager 104, one or more of inference processes 106, and/or experience design selector 108. The embodiments are not limited in this context.

In the illustrated embodiments, logic flow 500 may begin at block 502. At block 502 "determining information corresponding to a request for website data from a client device, the information associated with the client device" information corresponding to a request for website data from a client device may be determined. For example, inference manager 204 may determine information corresponding page request 205 and associated with client device 202. Proceeding to block 504 "starting a timer, a first inference process, and a second inference process based on the information, wherein the first inference process utilizes a first machine learning algorithm in conjunction with a first datastore to classify the information and the second inference process utilizes a second machine learning algorithm in conjunction with a second datastore to classify the information" a timer, a first inference process that utilizes a first machine learning algorithm in conjunction with a first datastore to classify the information, and a second inference process that utilizes a second machine learning algorithm in conjunction with a second datastore to classify the information may be initiated. In various embodiments, inference manager 204 may initiate timer 250, inference process 206-1, and inference process 206-2 based on information in page request 205. In various such embodiments, inference process 206-1 may utilize inference model 252-1 and datastore 254-1 while inference process 206-2 may utilize inference model 252-2 and datastore 254-2.

Proceeding to block 506 "selecting a first website dataset from two or more website datasets to provide to the client device in response to the request for website data when the first inference process returns a first positive result prior to expiration of the timer, wherein selection of the first website dataset is based on the first positive result" a first website dataset may be selected to provide to the client device in response to the request for website data when the first inference process returns a first positive result prior to expiration of the timer. For example, experience design selector 208 may select website dataset 256-1 when inference process 206-1 returns a positive result (e.g., results with no error) before timer 250 expires.

At block 508 "selecting a second website dataset from the set of two or more website dataset s to provide to the client device in response to the request for website data when the second inference process returns a second positive result prior to expiration of the timer and the first inference process fails to return any result or returns a first error result prior to expiration of the timer, wherein selection of the second website dataset is based on the second positive result" a second website dataset may be selected from the set of website datasets to provide to the client device in response to the request for website data when the second inference process returns a second positive result prior to expiration of the timer and the first inference process fails to return any result or returns a first error result prior to expiration of the timer. For example, experience design selector 208 may choose website dataset 256-2 when inference process 206-2 returns a positive result (e.g., results with no error) and inference process 206-1 fails to return a result before timer 250 expires or returns an error result.

Figure 6:
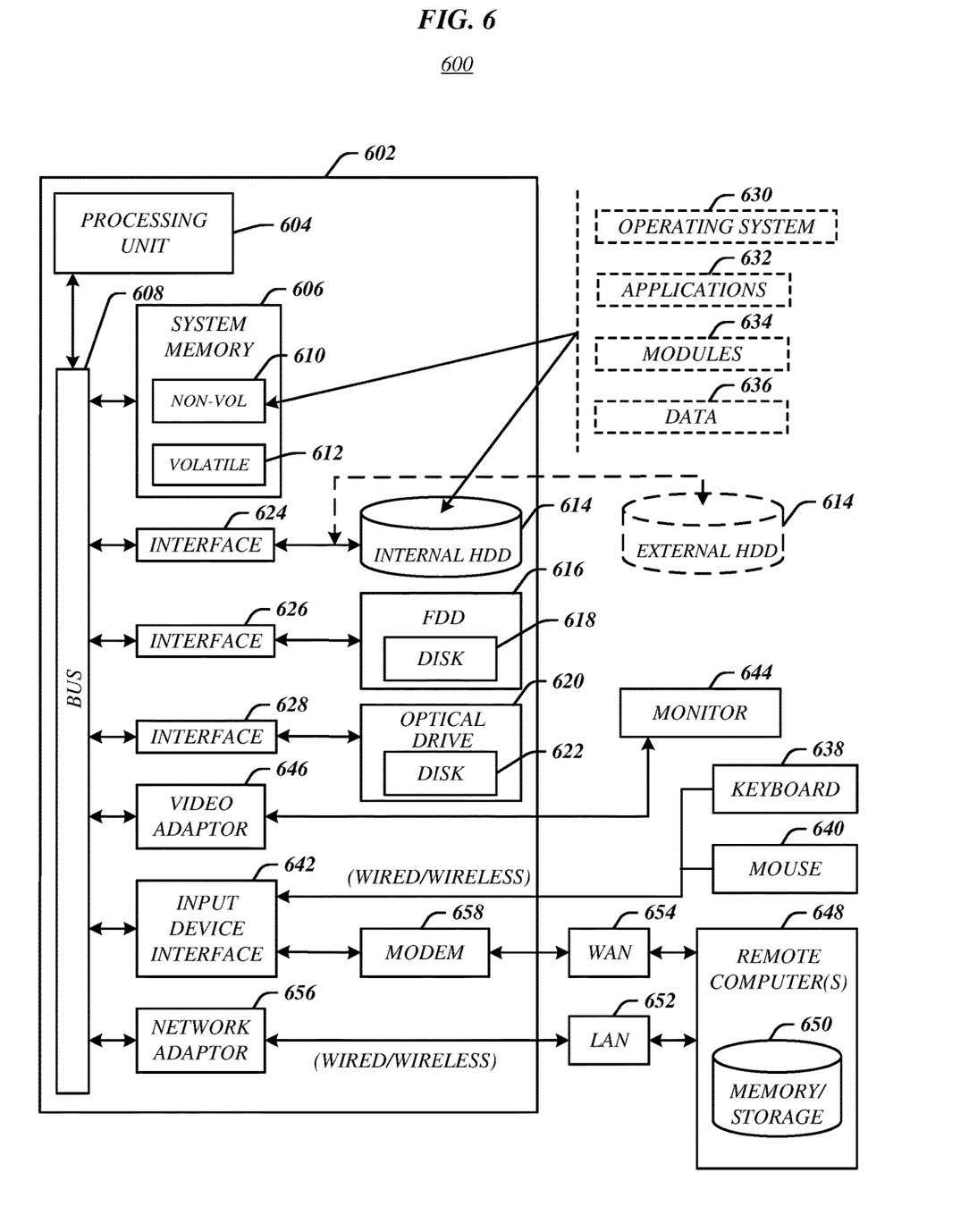
FIG. 6 illustrates exemplary aspects of a computing architecture according to one or more embodiments described herein.

FIG. 6 illustrates an embodiment of an exemplary computing architecture 600 that may be suitable for implementing various embodiments as previously described. In various embodiments, the computing architecture 600 may comprise or be implemented as part of an electronic device. In some embodiments, the computing architecture 600 may be representative, for example, of one or more component described herein. In some embodiments, computing architecture 600 may be representative, for example, of a computing device that implements or utilizes one or more portions of components and/or techniques described herein, such as client device 102, inference manager 104, one or more of inference processes 106, experience design selector 108, one or more of inference models 252, and/or one or more of datastores 254. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 600. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 600 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 600.

As shown in FIG. 6, the computing architecture 600 comprises a processing unit 604, a system memory 606 and a system bus 608. The processing unit 604 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 604.

The system bus 608 provides an interface for system components including, but not limited to, the system memory 606 to the processing unit 604. The system bus 608 can be any of several types of bus structure that may further interconnect to a memory bus (with or without a memory controller), a peripheral bus, and a local bus using any of a variety of commercially available bus architectures. Interface adapters may connect to the system bus 608 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 6, the system memory 606 can include non-volatile memory 610 and/or volatile memory 612. In some embodiments, system memory 606 may include main memory. A basic input/output system (BIOS) can be stored in the non-volatile memory 610.

The computer 602 may include various types of computer-readable storage media in the form of one or more lower speed memory units, including an internal (or external) hard disk drive (HDD) 614, a magnetic floppy disk drive (FDD) 616 to read from or write to a removable magnetic disk 618, and an optical disk drive 620 to read from or write to a removable optical disk 622 (e.g., a CD-ROM or DVD). The HDD 614, FDD 616 and optical disk drive 620 can be connected to the system bus 608 by an HDD interface 624, an FDD interface 626 and an optical drive interface 628, respectively. The HDD interface 624 for external drive implementations can include at least one or both of Universal Serial Bus (USB) and Institute of Electrical and Electronics Engineers (IEEE) 994 interface technologies. In various embodiments, these types of memory may not be included in main memory or system memory.

The drives and associated computer-readable media provide volatile and/or nonvolatile storage of data, data structures, computer-executable instructions, and so forth. For example, a number of program modules can be stored in the drives and memory units 610, 612, including an operating system 630, one or more application programs 632, other program modules 634, and program data 636. In one embodiment, the one or more application programs 632, other program modules 634, and program data 636 can include or implement, for example, the various techniques, applications, and/or components described herein.

A user can enter commands and information into the computer 602 through one or more wire/wireless input devices, for example, a keyboard 638 and a pointing device, such as a mouse 640. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 604 through an input device interface 642 that is coupled to the system bus 608 but can be connected by other interfaces such as a parallel port, IEEE 994 serial port, a game port, a USB port, an IR interface, and so forth.

A monitor 644 or other type of display device is also connected to the system bus 608 via an interface, such as a video adaptor 646. The monitor 644 may be internal or external to the computer 602. In addition to the monitor 644, a computer typically includes other peripheral output devices, such as speakers, printers, and so forth.

The computer 602 may operate in a networked environment using logical connections via wire and/or wireless communications to one or more remote computers, such as a remote computer 648. In various embodiments, one or more interactions described herein may occur via the networked environment. The remote computer 648 can be a workstation, a server computer, a router, a personal computer, portable computer, microprocessor-based entertainment appliance, a peer device or other common network node, and typically includes many or all of the elements described relative to the computer 602, although, for purposes of brevity, only a memory/storage device 650 is illustrated. The logical connections depicted include wire/wireless connectivity to a local area network (LAN) 652 and/or larger networks, for example, a wide area network (WAN) 654. Such LAN and WAN networking environments are commonplace in offices and companies, and facilitate enterprise-wide computer networks, such as intranets, all of which may connect to a global communications network, for example, the Internet.

When used in a LAN networking environment, the computer 602 is connected to the LAN 652 through a wire and/or wireless communication network interface or adaptor 656. The adaptor 656 can facilitate wire and/or wireless communications to the LAN 652, which may also include a wireless access point disposed thereon for communicating with the wireless functionality of the adaptor 656.

When used in a WAN networking environment, the computer 602 can include a modem 658, or is connected to a communications server on the WAN 654 or has other means for establishing communications over the WAN 654, such as by way of the Internet. The modem 658, which can be internal or external and a wire and/or wireless device, connects to the system bus 608 via the input device interface 642. In a networked environment, program modules depicted relative to the computer 602, or portions thereof, can be stored in the remote memory/storage device 650. It will be appreciated that the network connections shown are exemplary and other means of establishing a communications link between the computers can be used.

The computer 602 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 7:
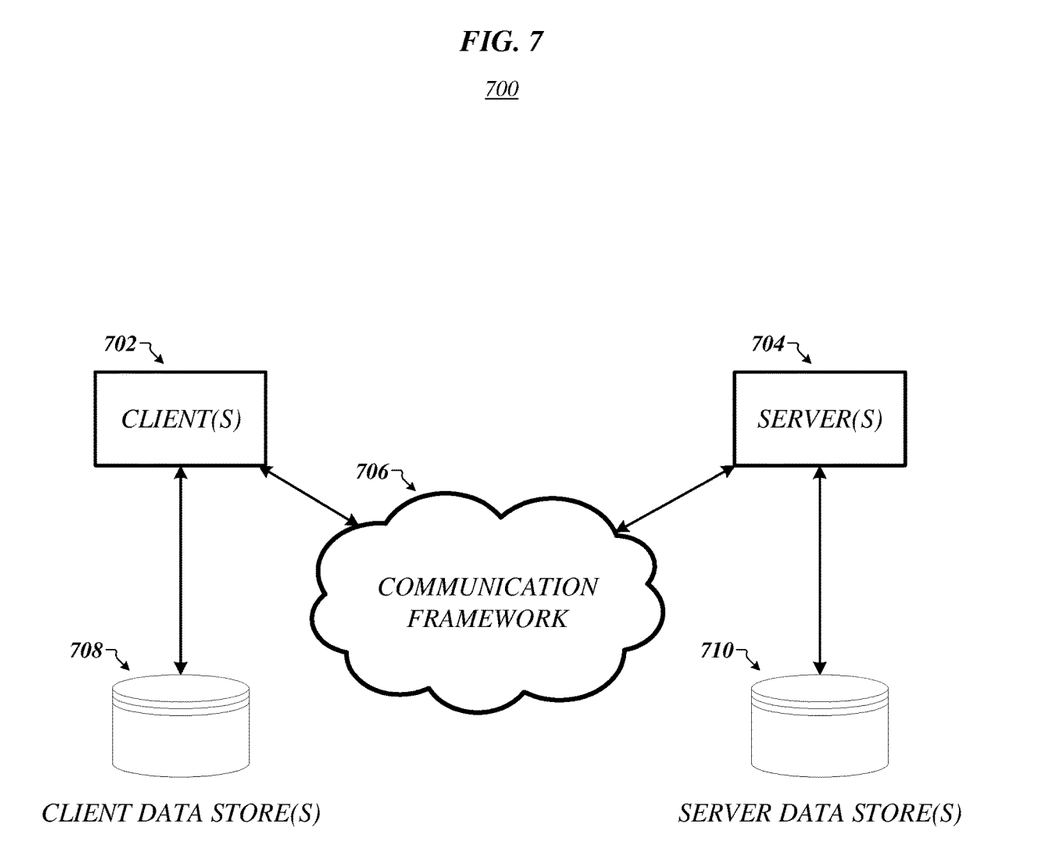
FIG. 7 illustrates exemplary aspects of a communications architecture according to one or more embodiments described herein.

FIG. 7 illustrates a block diagram of an exemplary communications architecture 700 suitable for implementing various embodiments, techniques, interactions, and/or components described herein, such as client device 102, inference manager 104, one or more of inference processes 106, experience design selector 108, one or more of inference models 252, and/or one or more of datastores 254. The communications architecture 700 includes various common communications elements, such as a transmitter, receiver, transceiver, radio, network interface, baseband processor, antenna, amplifiers, filters, power supplies, and so forth. The embodiments, however, are not limited to implementation by the communications architecture 700.

As shown in FIG. 7, the communications architecture 700 comprises includes one or more clients 702 and servers 704. In some embodiments, communications architecture may include or implement one or more portions of components, applications, and/or techniques described herein. The clients 702 and the servers 704 are operatively connected to one or more respective client data stores 708 and server data stores 710 that can be employed to store information local to the respective clients 702 and servers 704, such as cookies and/or associated contextual information. In various embodiments, any one of servers 704 may implement one or more of logic flows or operations described herein, such as in conjunction with storage of data received from any one of clients 702 on any of server data stores 710. In one or more embodiments, one or more of client data store(s) 708 or server data store(s) 710 may include memory accessible to one or more portions of components, applications, and/or techniques described herein.

The clients 702 and the servers 704 may communicate information between each other using a communication framework 706. The communications framework 706 may implement any well-known communications techniques and protocols. The communications framework 706 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 706 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1900 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 702 and the servers 704. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner and may generally include any set of one or more limitations as variously disclosed or otherwise demonstrated herein.

The invention claimed is:

1. An apparatus, comprising:
a processor; and
memory comprising instructions that when executed by the processor cause the processor to:
determine first identification information associated with a first request received from a client device;
initiate, in response to the first request, a first inference process, a second inference process, and a third inference process based on the first identification information, wherein the third inference process is characterized as higher accuracy than the first and second inference processes and the second inference process is characterized as higher accuracy than the first inference process;
identify a positive result from the first inference process;
identify an error result from the third inference process;
terminate the second inference process based on the positive result from the first inference process;
select a user experience design to provide to the client device in a response to the first request based on the positive result from the first inference process and the error result from the third inference process;
determine second identification information associated with a second request received from the client device; and
initiate, in response to the second request, the third inference process based on the second identification information and characterization of the third inference process as higher accuracy than the first and second inference processes.

2. The apparatus of claim 1, wherein the first inference process utilizes a first datastore and the second inference process utilizes a second datastore separate from the first datastore.

3. The apparatus of claim 1, wherein the first request received from the client device comprises a page request for a website and the response comprises a page response with the user experience design selected by the processor.

4. At least one non-transitory computer-readable medium comprising a set of instructions that, in response to being executed by a processor circuit, cause the processor circuit to:
determine first identification information associated with a first request received from a client device;
initiate, in response to the first request, a first inference process, a second inference process, and a third inference process based on the first identification information, wherein the third inference process is characterized as higher accuracy than the first and second inference processes and the second inference process is characterized as higher accuracy than the first inference process;
identify a positive result from the first inference process;
identify an error result from the third inference process;
terminate the second inference process based on the positive result from the first inference process;
select a user experience design to provide to the client device in a response to the first request based on the positive result from the first inference process and the error result from the third inference process;
determine second identification information associated with a second request received from the client device; and
initiate, in response to the second request, the third inference process based on the second identification information, and characterization of the third inference process as higher accuracy than the first and second inference processes.

5. The at least one non-transitory computer-readable medium of claim 4, wherein the first inference process utilizes a first datastore and the second inference process utilizes a second datastore separate from the first datastore.

6. The at least one non-transitory computer-readable medium of claim 4, wherein the first request received from the client device comprises a page request for a website and the response comprises a page response with the user experience design selected by the processor.

7. A computer-implemented method, comprising:
determining first identification information associated with a first request received from a client device;
initiating, in response to the first request, a first inference process, a second inference process, and a third inference process based on the first identification information, wherein the third inference process is characterized as higher accuracy than the first and second inference processes and the first inference process is characterized as higher accuracy than the second inference process;
identifying a positive result from the first inference process;
identifying an error result from the third inference process;
terminating the second inference process based on the positive result from the first inference process;
selecting a user experience design to provide to the client device in a response to the first request based on the positive result from the first inference process and the error result from the third inference process;
determining second identification information associated with a second request received from the client device; and
initiating, in response to the second request, the third inference process based on the second identification information, and characterization of the third inference process as higher accuracy than the first and second inference processes.

8. The computer-implemented method of claim 7, wherein the first inference process utilizes a first datastore and the second inference process utilizes a second datastore separate from the first datastore.

9. The computer-implemented method of claim 7, wherein the first request received from the client device comprises a page request for a website and the response comprises a page response with the user experience design selected.

10. The apparatus of claim 1, the memory comprising instructions that when executed by the processor cause the processor to:
identify a positive result from the third inference in response to the second request; and
select a user experience design to provide to the client device in a response to the second request based on a positive result from the third inference process and characterization of the third inference process as higher accuracy than the first and second inference processes.

11. The apparatus of claim 1, the memory comprising instructions that when executed by the processor cause the processor to:
determine the second identification information includes additional information regarding the client device than the first identification information; and
initiate, in response to the second request, the first inference process based on the second identification information including additional information regarding the client device than the first identification information.

12. The at least one non-transitory computer-readable medium of claim 4, comprising instructions that, in response to being executed by the processor circuit, cause the processor circuit to:
identify a positive result from the third inference in response to the second request; and select a user experience design to provide to the client device in a response to the second request based on a positive result from the third inference process and characterization of the third inference process as higher accuracy than the first and second inference processes.

13. The at least one non-transitory computer-readable medium of claim 4, comprising instructions that, in response to being executed by the processor circuit, cause the processor circuit to:
   determine the second identification information includes additional information regarding the client device than the first identification information; and
   initiate, in response to the second request, the first inference process based on the second identification information including additional information regarding the client device than the first identification information.

14. The computer-implemented method of claim 7, comprising:
   identifying a positive result from the third inference in response to the second request; and
   selecting a user experience design to provide to the client device in a response to the second request based on a positive result from the third inference process and characterization of the third inference process as higher accuracy than the first and second inference processes.

15. The computer-implemented method of claim 7, comprising:
   determining the second identification information includes additional information regarding the client device than the first identification information; and
   initiating, in response to the second request, the first inference process based on the second identification information including additional information regarding the client device than the first identification information.

* * * * *